No. 801,890. PATENTED OCT. 17, 1905.
C. J. MILLER.
STORE SERVICE APPARATUS.
APPLICATION FILED FEB. 28, 1905.

WITNESSES
INVENTOR
CHARLES J. MILLER
BY
HIS ATTORNEYS

UNITED STATES PATENT OFFICE.

CHARLES J. MILLER, OF MINNEAPOLIS, MINNESOTA.

STORE-SERVICE APPARATUS.

No. 801,890. Specification of Letters Patent. Patented Oct. 17, 1905.

Application filed February 28, 1905. Serial No. 247,677.

*To all whom it may concern:*

Be it known that I, CHARLES J. MILLER, of Minneapolis, Hennepin county, Minnesota, have invented certain new and useful Improvements in Store-Service Apparatus, of which the following is a specification.

The object of this invention is to provide means to prevent a basket or package-receptacle from becoming accidentally detached from the carrier while passing from one line-station to another.

A further object is to provide a locking means which can be easily and quickly disengaged or released to allow the removal of the basket from the hanger whenever desired.

The invention consists generally in providing the basket with a locking device which engages the carrier-hanger and prevents vertical movement of the basket while passing between stations.

Further, the invention consists in various constructions and combinations, all as hereinafter described, and particularly pointed out in the claims.

Figure 1:
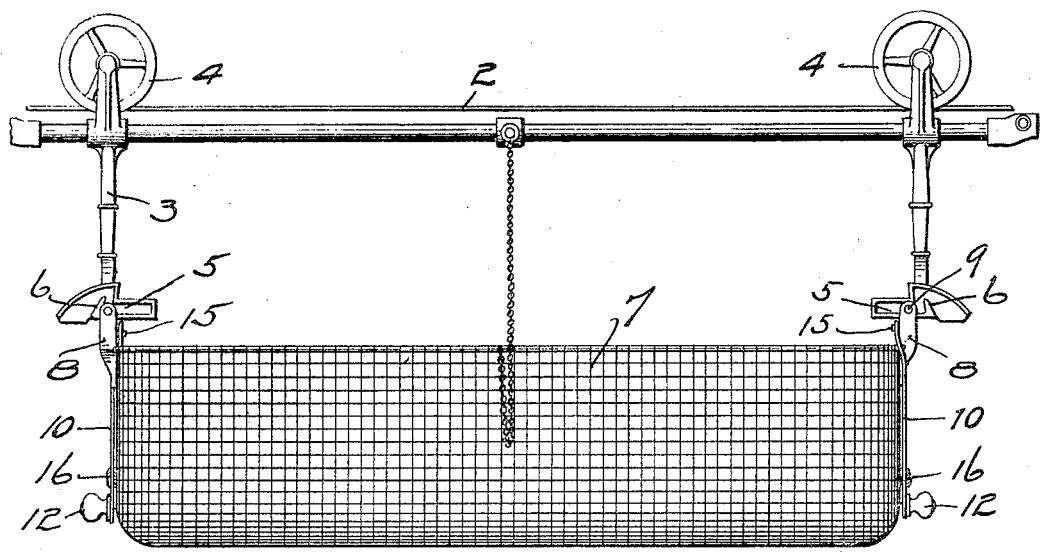
Figures 2, 3:
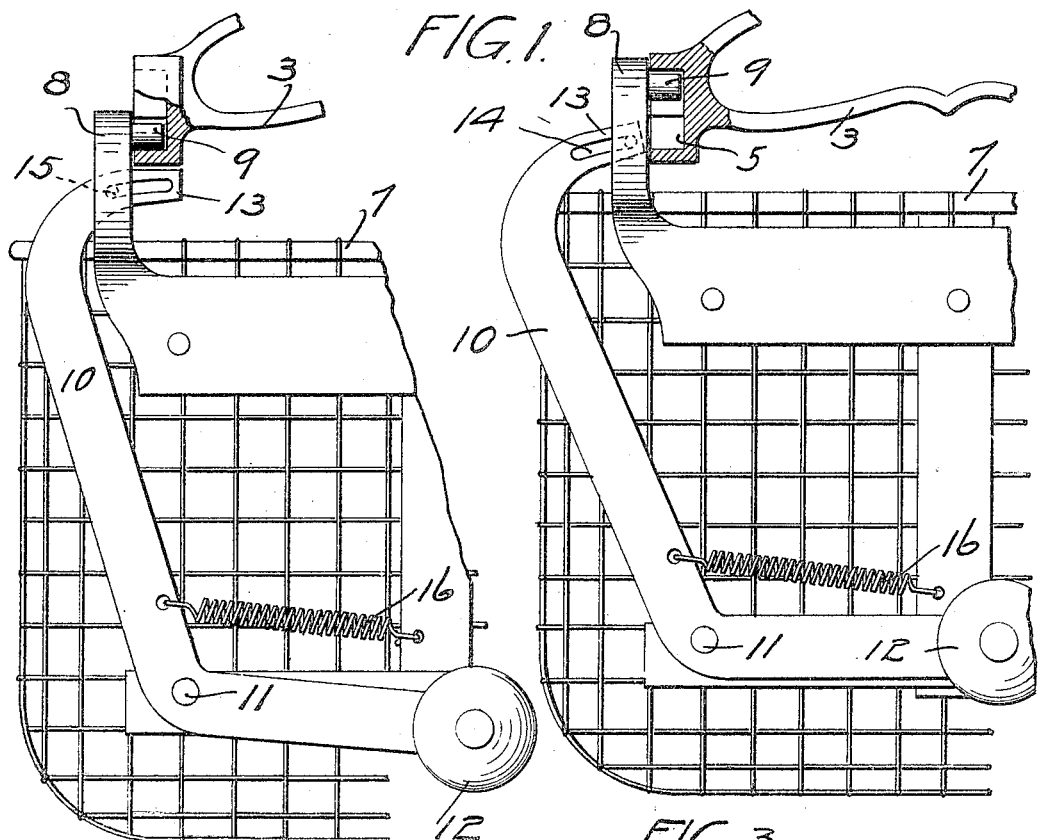

In the accompanying drawings, forming part of this specification, Figure 1 is a side elevation of a basket and carrier with my invention applied thereto. Fig. 2 is an end view of the basket, showing the locking device thereon in its locked position. Fig. 3 is a similar view showing the locking device in its unlocked position.

In the drawings, 2 represents the line-wire, and 3 hangers, having wheels 4 to travel upon the wire and sockets 5 at their lower ends, wherein the package-receptacle or basket is supported. These hangers and their sockets, as well as the basket, are all substantially the same as those shown and described in a pending application for Letters Patent of the United States filed by me April 23, 1904, Serial No. 204,564. These sockets, as shown in Fig. 1, are horizontally open at one end and partially closed at that end by a lug 6, it being necessary to lift the end of the basket to raise the pivots thereof sufficiently to clear the lug before the basket can be detached from the carrier.

I have found in practice that the basket will sometimes jump upon being suddenly stopped when entering a station, and if the pivots happen to be in the right position the upward movement of the basket will disengage them from the sockets and allow the baskets to fall prematurely. The primary object of this invention is to provide means to prevent such premature separation of the baskets from the hangers.

As fully shown and described in the application above referred to, the basket 7 is provided with brackets 8 at each end, having laterally-extending pivot-pins 9, that fit into the sockets in the hangers and allow the basket to be detached at either end and swung down on the pivots at that end to permit articles to be placed in the basket or removed therefrom. Below the brackets 8 on each end of the basket I provide bell-cranks 10, pivoted at 11 and having their short arms extending horizontally across the ends of the basket and provided with operating-knobs 12. The long arms of the bell-cranks have ends 13, that are turned inwardly beneath the carrier-hangers and provided with longitudinal slots 14 to receive screws 15, that are carried by the brackets 8. The slots 14 are made of sufficient length to allow the full stroke of the bell-cranks 10, and the screws 15 limiting the movement of said cranks in each direction. Springs 16 tend to hold the bell-cranks in their locked position at all times.

The operation of the invention is as follows: The bell-cranks in their normal position will extend beneath the carrier-hangers and prevent any possibility of the basket jumping up at one or both ends and becoming separated from the carrier-sockets. When it is desired to lower the basket, the operator will press upon the operating-knob, swing the lower arm of the bell-crank out from under the carrier-hanger, whereupon that end of the basket can be raised and disengaged from the socket. If it is desired to disengage the basket at both ends, then the operator will move both bell-cranks and release the pivots at each end.

I claim as my invention—

1. The combination, with a carrier having sockets, of a package-receptacle or basket having pivots fitting within said sockets and separable therefrom by raising said basket a predetermined distance, and means for locking said basket to prevent the premature separation of its pivots from said sockets, substantially as described.

2. The combination, with carrier-hangers having sockets, of a basket having pivot-pins fitting within said sockets, and means preventing the premature separation of said pins from said sockets.

3. The combination, with a carrier, of a package-receptacle hinged on said carrier at each end and adapted to be detached one end at a time and swung down on its pivot at the other end, and means for locking said ends to prevent the premature separation of said receptacle from said carrier.

4. The combination, with a carrier, of a package-receptacle hinged at each end thereon, either end of said receptacle being detachable from said carrier by raising that end, and means for preventing the premature elevation of said ends, substantially as described.

5. The combination, with a carrier having hangers, of a basket having brackets pivoted in sockets in said hangers and separable therefrom by raising the ends of said baskets, and levers pivoted on said basket and having ends extending beneath said hangers and preventing the premature raising of said basket.

6. The combination, with a carrier, of a basket having brackets pivoted thereon and separable therefrom by raising the ends of the basket, and levers carried by said basket and adapted to pass beneath said hangers to temporarily lock them and said brackets together.

7. The combination, with a carrier, of a basket having a bracket pivoted thereon and separable therefrom by raising the end of the basket, and means arranged to prevent the premature upward movement of said basket, and means for limiting the movement of said locking means.

8. The combination, with a carrier, of a basket having brackets pivoted thereon and separable therefrom by raising the ends of the basket, bell-crank levers pivoted on each end of said basket and having ends to pass under said carrier and prevent vertical movement of the basket, and screws carried by said brackets and fitting within slots in said levers to limit the movement thereof.

In witness whereof I have hereunto set my hand this 21st day of December, 1904.

CHARLES J. MILLER.

Witnesses:
RICHARD PAUL,
C. MACNAMARA.